United States Patent
Hong et al.

(10) Patent No.: US 10,776,262 B2
(45) Date of Patent: Sep. 15, 2020

(54) MEMORY SYSTEM AND OPERATING METHOD THEREOF

(71) Applicant: SK hynix Inc., Icheon (KR)

(72) Inventors: Do-Sun Hong, Icheon (KR); Jung Hyun Kwon, Seoul (KR); Won Gyu Shin, Icheon (KR); Seung Gyu Jeong, Icheon (KR)

(73) Assignee: SK hynix Inc., Icheon (KR)

( * ) Notice: Subject to any disclaimer, the term of this patent is extended or adjusted under 35 U.S.C. 154(b) by 52 days.

(21) Appl. No.: 16/169,835

(22) Filed: Oct. 24, 2018

(65) Prior Publication Data
US 2019/0278706 A1 Sep. 12, 2019

(30) Foreign Application Priority Data
Mar. 8, 2018 (KR) .................. 10-2018-0027514

(51) Int. Cl.
*G06F 12/00* (2006.01)
*G06F 12/02* (2006.01)
*G06F 3/06* (2006.01)

(52) U.S. Cl.
CPC ........ *G06F 12/0246* (2013.01); *G06F 3/0604* (2013.01); *G06F 3/0631* (2013.01); *G06F 3/0679* (2013.01); *G06F 12/0207* (2013.01); *G06F 2212/1016* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 9,514,043 B1 | 12/2016 | Patel | |
| 2008/0294813 A1* | 11/2008 | Gorobets | G06F 12/0246 710/62 |
| 2009/0089485 A1* | 4/2009 | Yeh | G06F 12/0246 711/103 |
| 2010/0017555 A1* | 1/2010 | Chang | G06F 12/0246 711/103 |
| 2019/0303283 A1* | 10/2019 | McGlaughlin | G06F 12/0246 |

FOREIGN PATENT DOCUMENTS

KR 10-2016-0075918 A 6/2016

* cited by examiner

*Primary Examiner* — John A Lane

(57) ABSTRACT

A memory system may include a nonvolatile memory device and a wear leveling unit. The nonvolatile memory device includes a plurality of memory blocks. The wear leveling unit may be configured to intermittently increase an accumulative access count of a memory block among the memory blocks by a predetermined value, decide a wear level of the memory block based on the accumulative access count whenever the accumulative access count is increased, set the memory block to a hot block based on the wear level, and perform a hot block management operation on the hot block. The wear leveling unit may increase the accumulative access count in response to an access count reaching a predetermined value. The accumulative access count may be stored in the nonvolatile memory device, and the access count may be stored in a volatile memory device.

39 Claims, 11 Drawing Sheets

FIG.6

| LBA | PBA | AC | LBMT |
|---|---|---|---|
| 0 | | | |
| 1 | 3 | 98 | ~ LBA1 |
| ⋮ | ⋮ | ⋮ | |
| 5 | | | |

Volatile Memory Device (120)

| PBA | LBA | AAC | PBMT |
|---|---|---|---|
| 0 | | | |
| 1 | | | |
| 2 | | | |
| 3 | 1 | 9800 | ~ PBA3 |
| ⋮ | ⋮ | ⋮ | |
| 7 | | | |

Nonvolatile Memory Device (130)

FIG.7
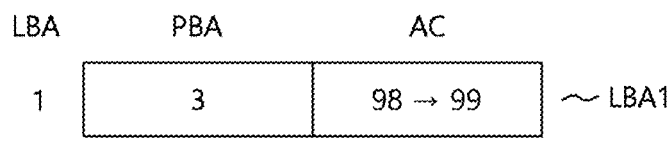
(T71)
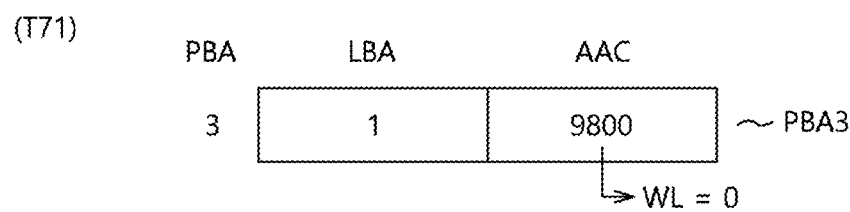
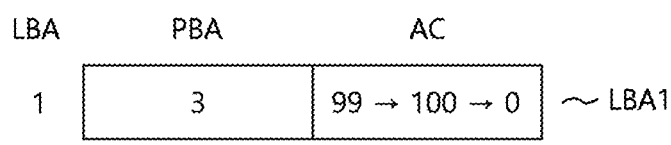
(T72)
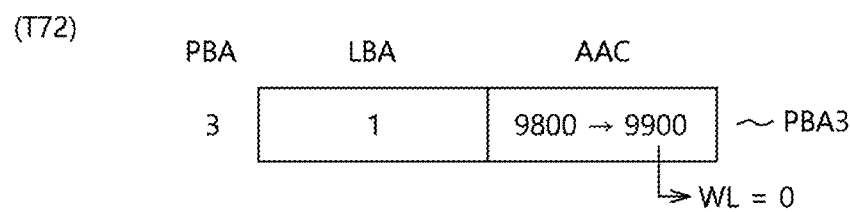
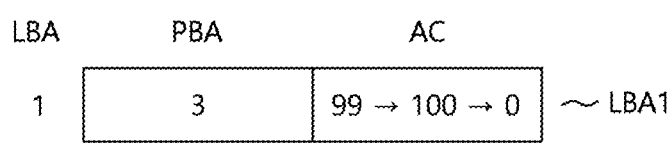
(T73)
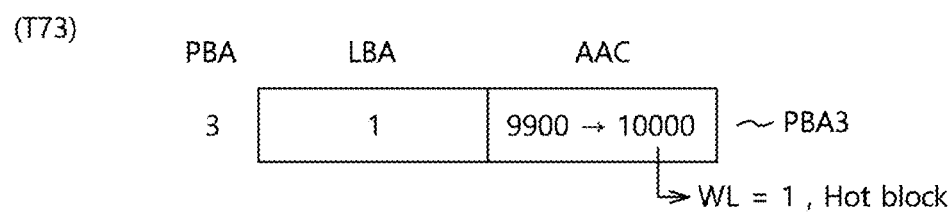

MEMORY SYSTEM AND OPERATING METHOD THEREOF

CROSS-REFERENCES TO RELATED APPLICATION

The present application claims priority under 35 U.S.C. § 119(a) to Korean application number 10-2018-0027514, filed on Mar. 8, 2018, in the Korean Intellectual Property Office, which is incorporated herein by reference in its entirety.

BACKGROUND

1. Technical Field

Various embodiments generally relate to a memory system, and more particularly, to a memory system including a nonvolatile memory device.

2. Related Art

Memory systems store data provided by an external device in response to a write request. Memory systems may also provide stored data to an external device in response to a read request. Examples of external devices that use memory systems include computers, digital cameras, cellular phones, and the like. Memory systems may be embedded in an external device during manufacturing of the external devices or may be fabricated separately and then connected afterwards to an external device.

SUMMARY

In an embodiment, a memory system may include: a nonvolatile memory device including a plurality of memory blocks; and a wear leveling unit configured to increase an accumulative access count of a first memory block among the memory blocks by a predetermined value, determine a wear level of the first memory block based on the accumulative access count when the accumulative access count is increased, set the first memory block to a hot block based on the wear level, and perform a hot block management operation on the hot block.

In an embodiment, a memory system may include: a nonvolatile memory device including memory blocks; and a wear leveling unit configured to update an accumulative access count of a first memory block when an access count of the first memory block reaches a check count, and perform a hot block management operation on the first memory block when a wear level calculated from the accumulative access count exceeds a reference level.

In an embodiment, a memory system may include: a nonvolatile memory device including memory blocks; a wear leveling unit configured to manage wear levels of the memory blocks, and perform a hot block management operation on a first memory block when wear level of the memory block exceeds a reference level. The wear leveling unit may increase the reference level when all of the wear levels exceed the reference level.

BRIEF DESCRIPTION OF THE DRAWINGS

FIG. 6 illustrates a logical block mapping table and a physical block mapping block according to an embodiment.

FIG. 7 illustrates a process of setting a target memory block to a hot block according to an embodiment.

DETAILED DESCRIPTION

Figure 1:
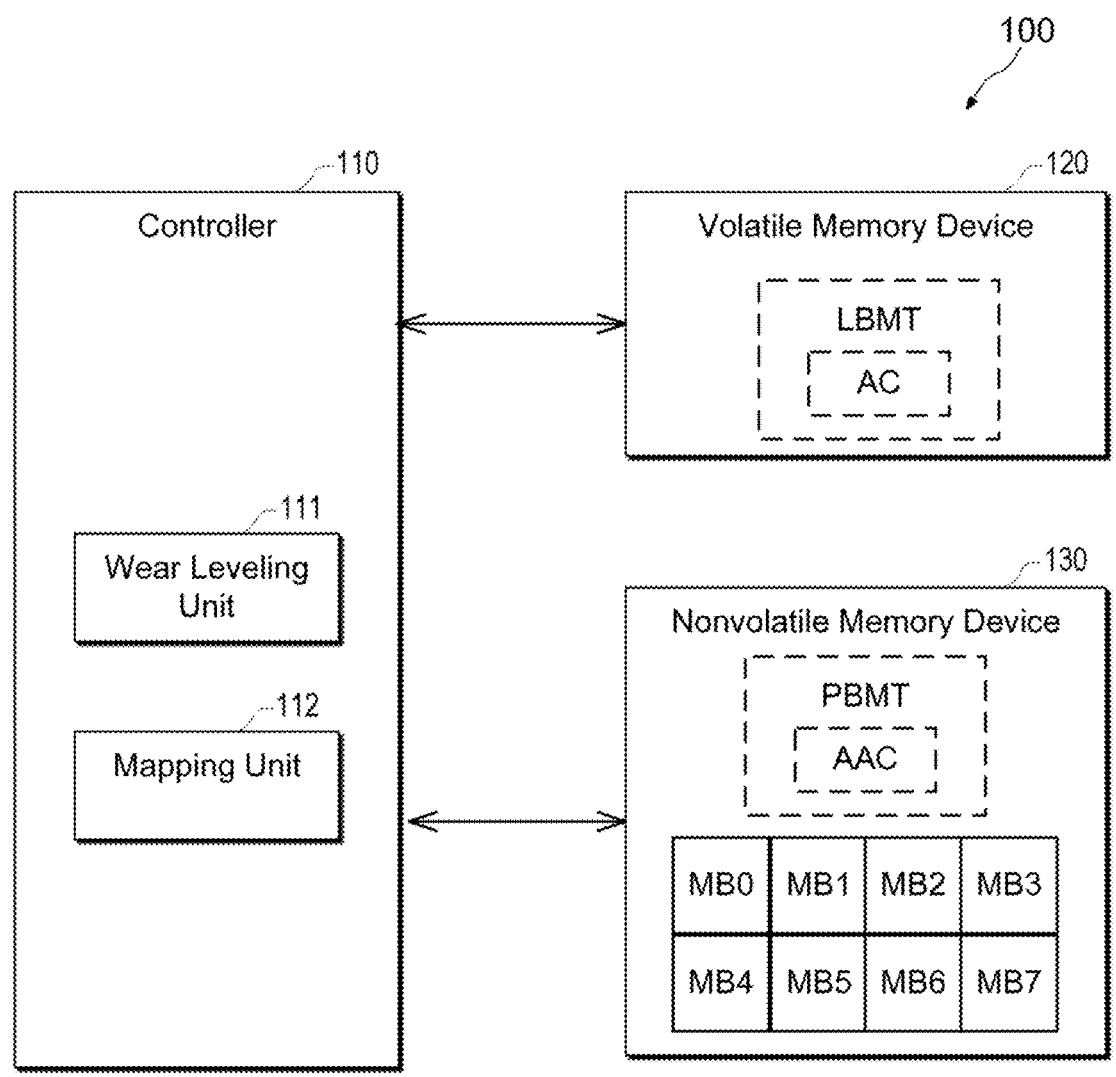
FIG. 1 is a block diagram illustrating a memory system in accordance with an embodiment.

Hereinafter, a data storage device and an operating process thereof according to the present invention will be described with reference to the accompanying drawings through illustrative embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including" when used in this specification, specify the presence of the stated elements, and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

FIG. 1 is a block diagram illustrating a memory system 100 in accordance with an embodiment.

The memory system 100 may be configured to store data provided from an external host device in response to a write request of the host device. Furthermore, the memory system 100 may be configured to provide data stored therein to the host device in response to a read request of the host device.

The memory system 100 may be embodied in a Personal Computer Memory Card International Association (PCM-CIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD), or the like.

The memory system 100 may include a controller 110, a volatile memory device 120 and a nonvolatile memory device 130.

The controller 110 may control the overall operations of the memory system 100. The controller 110 may access the nonvolatile memory device 120 in response to a write or read request from the host device. Furthermore, the controller 110 may perform an internal management operation for maintaining the performance of the memory system 100 and extending the lifespan of the memory system 100, without a request for said operation from the host device.

The internal management operation may include a wear leveling operation. The wear leveling operation may indicate an operation of managing memory blocks MB0, MB1, MB2, MB3, MB4, MB5, MB6, and MB7 included in the nonvolatile memory device 130 such that the memory blocks are evenly used and worn. When only a part of the memory blocks is used intensively and discarded early, the storage capacity and performance of the nonvolatile memory device 130 may be reduced, while the lifespan of the nonvolatile memory device 130 is shortened. The wear leveling operation may be performed to overcome such a problem. The controller 110 may include a wear leveling unit 111 configured to perform a wear leveling operation.

While FIG. 1 illustrates the nonvolatile memory device 130 including eight memory blocks MB0 to MB7, embodiments are not limited thereto and may include fewer or substantially more than eight memory blocks.

The wear leveling unit 111 may identify an intensively used block (e.g., a hot block) by checking the wear levels of the memory blocks included in the nonvolatile memory device 130 through access counts AC, and perform a hot block management operation to suppress an access to the hot block. That is, the use of the hot block having a high wear level may be limited, and a cold block having a low wear level may be used instead of the hot block. In this way, the wear leveling of the memory blocks can be achieved.

The wear leveling unit 111 may manage the access counts AC of the memory blocks included in the nonvolatile memory device 130 through the volatile memory device 120. The wear leveling unit 111 may accumulate the access count AC of a certain memory block, stored in the volatile memory device 120, into an accumulative access count AAC of the same memory block, stored in the nonvolatile memory device 130, in each predetermined cycle.

The wear leveling unit 111 may intermittently perform the operation of checking whether a memory block is a hot block, such as in response to the accumulative access count ACC of the memory block being updated. In an embodiment, when the wear leveling unit 111 intermittently performs the check operation, it may not check whether a memory block is a hot block every time the memory block is accessed, but performs the check operation when a predetermined condition is satisfied while accesses are repeated.

A hot block check operation may degrade the performance of the nonvolatile memory device 130 when the nonvolatile memory device 130 is operated. In the present embodiment, however, the hot block check operation may be intermittently performed to prevent or reduce the performance degradation. Furthermore, because the access count AC is preferentially managed in the volatile memory device 120 with high operating speed before the access count AC is accumulated into the accumulative access count AAC of the nonvolatile memory device 130, the operation performance of the nonvolatile memory device 130 can be maintained.

The wear leveling unit 111 may decide the wear level of a memory block based on the accumulative access count ACC of the memory block, and set the memory block to a hot block, based on the wear level of the memory block. When the wear level of the memory block exceeds a reference level, the wear leveling unit 111 may set the memory block to a hot block. Through this operation, the wear levels of the memory blocks in the nonvolatile memory device 130, which need to be evenly worn, may be retained around the reference level. Therefore, wear leveling can be effectively achieved.

The wear leveling unit 111 may perform the wear leveling operation on a memory block basis. The memory block may be larger than the unit by which the nonvolatile memory device performs a write operation, for example, a page. The memory block may include a plurality of pages. For example, the memory block may include pages with consecutive page addresses. For example, the memory block may include pages at the same positions in a plurality of banks which can be write-accessed in parallel by the nonvolatile memory device 130.

When a certain target page is accessed during the wear leveling operation on a memory block basis, the wear leveling unit 111 may consider that a memory block including the target page, i.e., a target memory block, is accessed.

The wear leveling unit 111 may increase the access count AC of the target memory block when the target memory block is accessed according to a request of the host device. In another embodiment, the wear leveling unit 111 may increase the access count AC of the target memory block even when the target memory block is accessed without a request of the host device. The configuration and operating process of the wear leveling unit 111 will be described in detail with reference to FIG. 5.

The controller 110 may further include a mapping unit 112. The mapping unit 112 may have a mapping table for managing a mapping relation between logical addresses of data, which is recognized by the host device, and physical addresses indicating the positions where the data are actually stored in the nonvolatile memory device 130. The mapping relation may be formed on a page basis on which the nonvolatile memory device 130 performs a write operation, formed on a data basis on which the host device allocates a logical address, or formed on various other bases depending on the processing ability and purpose of the controller 110.

When the wear leveling operation is performed on a memory block basis as described above, the mapping unit 112 may form a mapping relation on a memory block basis. The mapping table may include a physical block mapping table PBMT which stores a mapping relation from the physical block addresses of the memory blocks of the nonvolatile memory device 130 to the logical block addresses of data stored in the corresponding memory blocks. The logical block address may indicate a logical address corresponding to data on a memory block basis. The data stored in the same memory block may correspond to the same logical block address. When the storage position of data is changed by the wear leveling operation, the mapping unit 112 may correct the mapping relation.

For quick access and search, the physical block mapping table PBMT may be converted into a logical block mapping table LBMT which stores a mapping relation from the logical block addresses to the physical block addresses, and stored in the volatile memory device 120. The logical block mapping table LBMT may include the access counts AC of the memory blocks. The physical block mapping table PBMT may include the accumulative access counts AAC of the memory blocks. The configurations of the logical block mapping table LBMT and the physical block mapping table PBMT will be described in detail with reference to FIG. 6.

The volatile memory device 120 may function as a working memory, buffer memory, cache memory, or combinations thereof of the memory system 100. The volatile memory device 120 may serve as a working memory to store various program codes and program data which are used by the controller 110. For example, the volatile memory device 120 may store the mapping table. The volatile memory device 120 may serve as a buffer memory to temporarily store data transferred between an external device and the nonvolatile memory device 130. Furthermore, the volatile memory device 120 may serve as a cache memory to temporarily store cache data. FIG. 1 illustrates that the volatile memory device 120 is present outside the controller 110. In another embodiment, however, the volatile memory device 120 may be included in the controller 110.

The volatile memory device 120 may include a DRAM (Dynamic Random Access Memory), an SRAM (Static Random Access Memory) or the like.

The nonvolatile memory device 130 may store data transferred from the controller 110, read data stored therein and transfer the read data to the controller 110, or both, according to control of the controller 110.

The nonvolatile memory device 130 may include the plurality of memory blocks MB0 to MB7. The memory block may correspond to the unit by which the controller 110 performs a wear leveling operation. Each of the memory blocks may include a plurality of pages. As described above, the page may correspond to the unit by which the nonvolatile memory device 130 performs a write operation.

One or more of the memory blocks may store the physical block mapping table PBMT and the accumulative access count AAC.

The nonvolatile memory device 130 may include a Phase-Change Random Access Memory (PCRAM), a Magnetoresistive Random Access Memory (MRAM), a Ferroelectrics Random Access Memory (FeRAM), a Resistive Random Access Memory (ReRAM), and the like.

FIG. 1 illustrates that the memory system 100 includes one nonvolatile memory device 130, but the number of nonvolatile memory devices included in the memory system 100 is not limited thereto.

Figure 2:
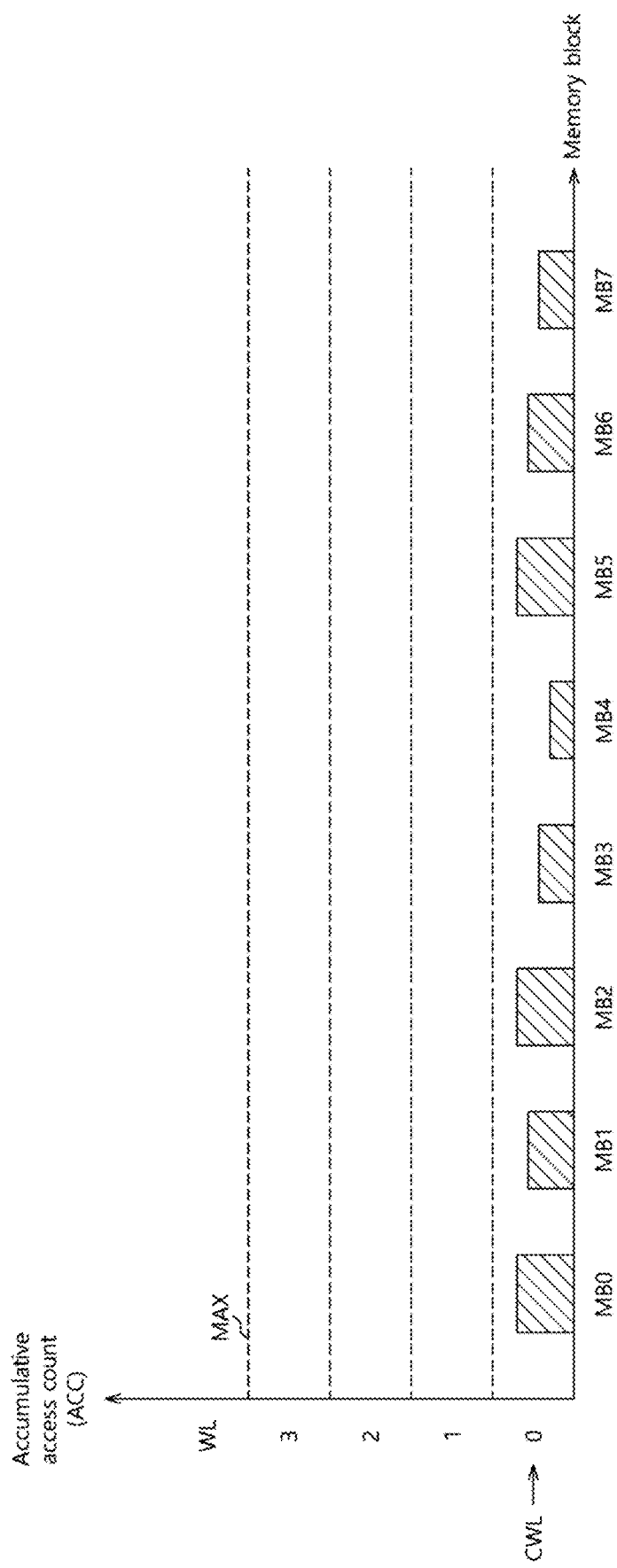
FIGS. 2, 3, and 4 illustrate operation of a process in which a wear leveling unit of FIG. 1 evenly maintains the wear levels of memory blocks at a reference level, according to an embodiment.
Figure 3:
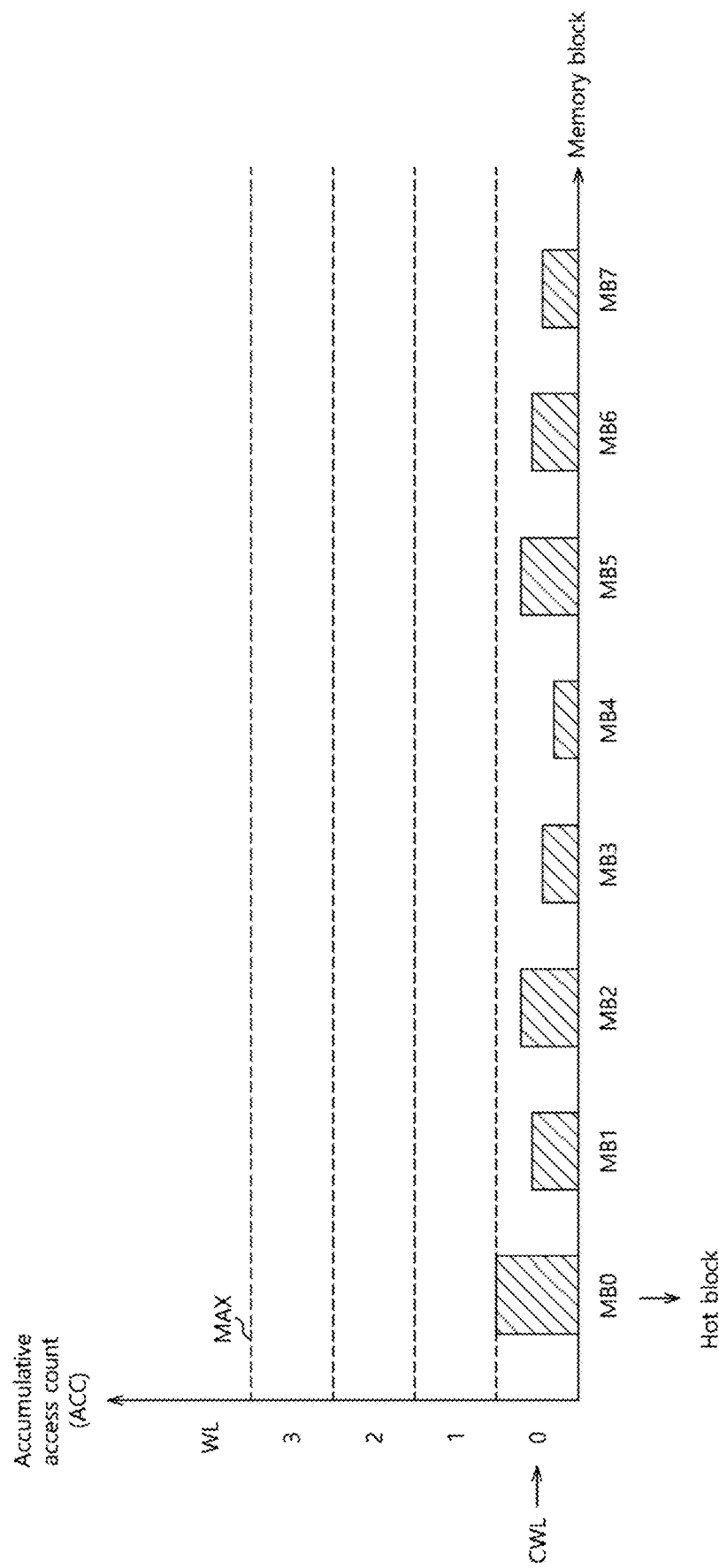
Figure 4:
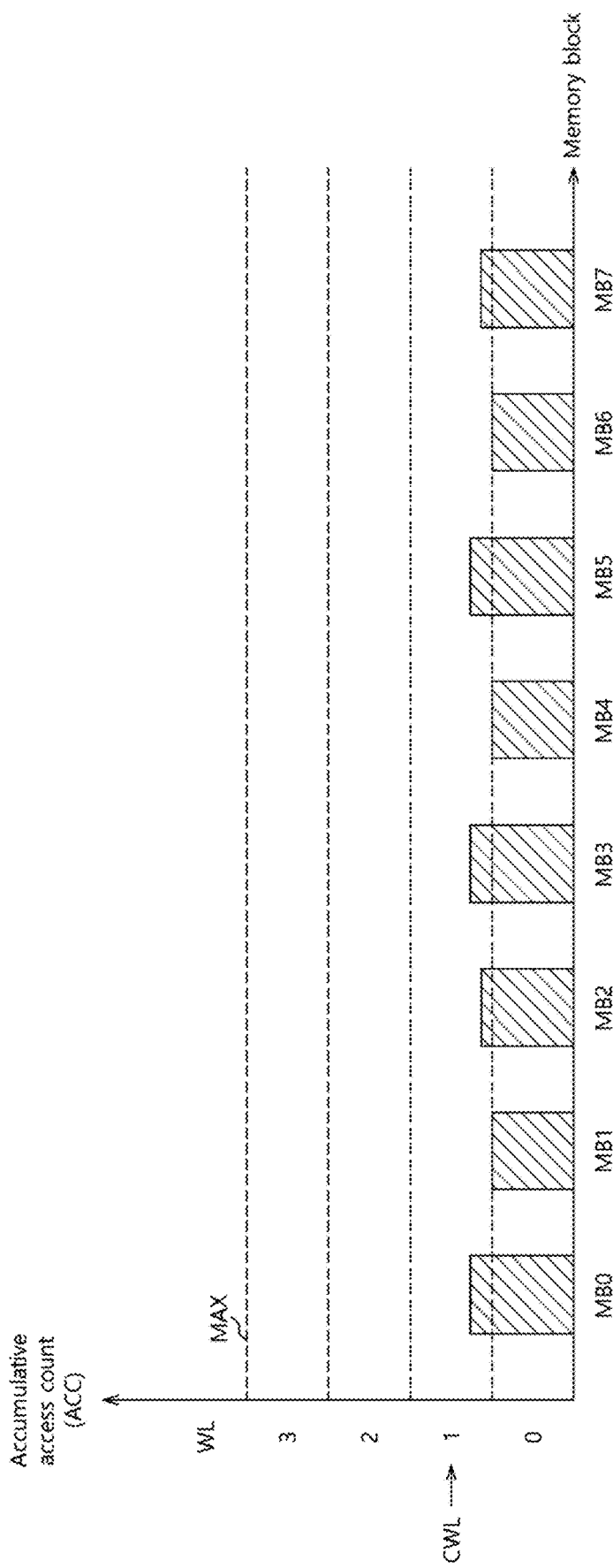

FIGS. 2 to 4 illustrate a process in which the wear leveling unit of FIG. 1 evenly maintains the wear levels of memory blocks (e.g., the memory blocks MB0 to MB7 in the nonvolatile memory device 130 of FIG. 1) at a reference level CWL. In the graphs of FIGS. 2 to 4, the horizontal axis indicates the memory blocks, and the vertical axis indicates the accumulative access counts AAC of the respective memory blocks.

Hereafter, the nonvolatile memory device 130 is assumed to include eight memory blocks MB0 to MB7. When the accumulative access count ACC of a certain memory block reaches the maximum accumulative access count MAX, for example, 40,000, the memory block may not be used anymore and discarded. The maximum accumulative access count MAX may correspond to the product of the number of pages included in one memory block and the maximum access count AC which a certain page is expected to endure.

The wear leveling unit 111 may determine the wear levels WL of the memory blocks MB0 to MB7 based on the accumulative access counts ACC of the corresponding memory blocks. The wear level WL of a memory block may indicate a section including the accumulative access count AAC of the memory block, among a predetermined number of sections obtained by dividing the maximum accumulative access count MAX. The wear level WL may be raised whenever the accumulative access count AAC of the corresponding memory block reaches a boundary between sections, i.e., a level raising point. When the wear level WL of the memory block is high, it may indicate that the memory block is substantially worn.

In the illustrative example shown in FIGS. 2 to 4, the maximum accumulative access count MAX of 40,000 may be divided into four sections, and the wear level WL may be raised from 0 to 1, 2, and 3, respectively, whenever the accumulative access count AAC reaches the level raising point 10,000, 20,000 and 30,000. In other words, the wear level WL of a memory block may correspond to the quotient of the accumulative access count ACC of the memory block, divided by 10,000. FIG. 2 illustrates a first time at which the wear levels WL of the memory blocks MB0 to MB7 may correspond to 0.

The wear levels WL may be raised from 0 to 3. The level raising points may correspond to 10,000, 20,000 and 30,000. As described above, the wear leveling unit 111 may perform the hot block check operation on the memory blocks whenever the accumulative access count AAC of a memory block is updated. At this time, the wear leveling unit 111 may compare the wear levels WL of the memory blocks MB0 to MB7 to the current reference level CWL, and check whether each of the memory blocks MB0 to MB7 is a hot block. When the result of the hot block check operation indicates that there is no memory block of which the wear level WL exceeds the reference level CWL, the wear leveling unit 111 may omit performing the hot block management operation.

FIG. 3 illustrates a time point at which the wear level WL of the memory block MB0 may be raised to 1 during the hot block check operation. Because the result of the hot block check operation indicates that the wear level WL of 1 in the memory block MB0 is higher than the reference level CWL, the wear leveling unit 111 may set the memory block MB0 to a hot block. Then, the wear leveling unit 111 may perform the hot block management operation to suppress a write access to the hot block MB0. Furthermore, whenever the wear level WL of each of the other memory blocks MB1 to MB7 is raised to 1, the wear leveling unit 111 may set that memory block to a hot block, and perform the hot block management operation.

Referring to FIG. 4, the wear leveling unit 111 may raise the reference level CWL to 1 based on the wear levels of the memory blocks MB0 to MB7. In the present embodiment, the wear leveling unit 111 raises the reference level CWL to 1 if the wear levels WL of all the memory blocks MB0 to MB7 correspond to 1. Thereafter, the memory blocks MB0 to MB7 having the same wear level WL as the raised reference level CWL of 1 may be considered as cold blocks. The wear leveling unit 111 may decide a hot block by comparing the wear levels WL of the memory blocks MB0 to MB7 to the reference level CWL of 1 during the hot block check operation. In another embodiment, the wear leveling unit 111 may increase the reference level CWL to 1 if a certain percentage (e.g., more than 85%) of the memory blocks have wear levels corresponding to 1.

Figure 5:
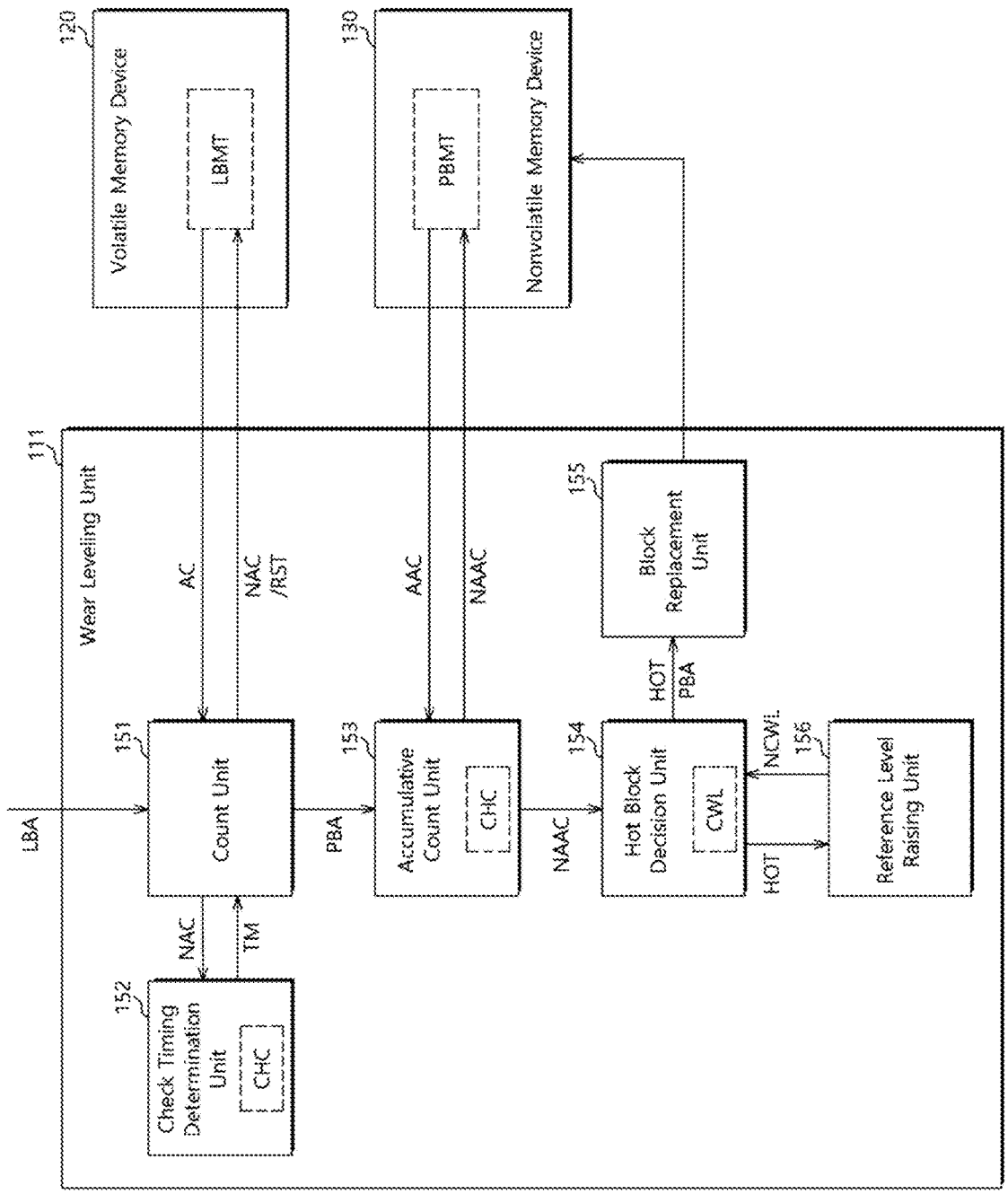
FIG. 5 is a block diagram illustrating the detailed configuration of the wear leveling unit of FIG. 1 according to an embodiment.

FIG. 5 is a block diagram illustrating the detailed configuration of the wear leveling unit 111 of FIG. 1. FIG. 5 also illustrates the volatile memory device 120 and the nonvolatile memory device 130 of FIG. 1, in order to promote understandings. The blocks (that is, the units) of the wear leveling unit 111 illustrated in FIG. 5 may be implemented in hardware, software, or a combination of hardware and software, in order to perform the above-described operations.

The wear leveling unit 111 may include a count unit 151, a check timing determination unit 152, an accumulative count unit 153, a hot block decision unit 154, a block replacement unit 155 and a reference level raising unit 156.

The count unit 151 may receive a logical block address LBA corresponding to a write-accessed memory block, i.e., a target memory block. The count unit 151 may find and read the access count AC of the target memory block in the logical block mapping table LBMT stored in the volatile memory device 120, based on the logical block address LBA, and increase the access count AC by 1. The count unit 151 may provide the increased access count NAC to the check timing determination unit 152.

The check timing determination unit 152 may determine whether a hot block check time for the target memory block has arrived (that is, whether the hot block check operation is to be performed on the target memory block) based on the increased access count NAC.

The check timing determination unit 152 may compare the increased access count NAC to a check count CHC in order to determine whether the hot block check timing has arrived. The check timing determination unit 152 may include a register (not illustrated) configured to store the check count CHC for comparison. The check timing determination unit 152 may provide the determination result TM to the count unit 151.

When the increased access count NAC is less than the check count CHC, the check timing determination unit 152 may determine that the hot block check time has not yet arrived. In this case, because the hot block check operation will not be performed, the hot block management operation for the target memory block may be skipped. The count unit 151 may store the increased access count NAC in the access count AC of the target memory block in the logical block mapping table LBMT of the volatile memory device 120, in response to the determination result TM indicating that the hot block check timing has not yet arrived.

However, when the increased access count NAC is equal to the check count CHC, the check timing determination unit 152 may determine that the hot block check time has arrived. The count unit 151 may provide a physical block address PBA to the accumulative count unit 153 in response to the determination result TM indicating that the hot block check time has arrived. Because the increased access count NAC will be accumulated in the accumulative access count ACC in case of the hot block check timing, the count unit 151 may store an access count reset value RST of 0 in the access count AC of the target memory block in the logical block mapping table LBMT of the volatile memory device 120.

The accumulative count unit 153 may find and read the accumulative access count AAC of the target memory block in the physical block mapping table stored in the nonvolatile memory device 130, based on the physical block address PBA transferred from the count unit 151, and increase the accumulative access count AAC by the check count CHC. That is, because the accumulative access count AAC needs to be increased by the increased access count NAC, the check count CHC of the accumulative count unit 153 may indicate the increased access count NAC. The accumulative count unit 153 may include a register (not illustrated) configured to store the check count CHC for addition. The accumulative count unit 153 may store the increased accumulative access count NAAC in the accumulative access count AAC of the target memory block in the physical block mapping table PBMT of the nonvolatile memory device 130.

The accumulative count unit 153 may provide the increased accumulative access count NAAC to the hot block decision unit 154.

The hot block decision unit 154 may check whether the target memory block is a hot block, based on the increased accumulative access count NAAC. That is, the hot block decision unit 154 may perform the hot block check operation in response to the accumulative access count AAC being updated into the increased accumulative access count NAAC. The hot block decision unit 154 may compare the reference level CWL to the wear level of the target memory block based on the increased accumulative access count NAAC, in order to check whether the target memory block is a hot block.

The hot block decision unit 154 may determine that the target memory block is not a hot block when the result of the hot block check operation indicates that the wear level is equal to (or not greater than) the reference level CWL. Accordingly, the hot block management operation for the target memory block may be skipped.

However, when the result of the hot block check operation indicates that the wear level is higher than the reference level CWL, the hot block decision unit 154 may determine that the target memory block is a hot block. In this case, the hot block decision unit 154 may provide the physical block address PBA of the target memory block and a result HOT to the block replacement unit 155, the result HOT indicating that the target memory block is a hot block. Furthermore, the hot block decision unit 154 may provide the reference level raising unit 156 with the result HOT indicating that the target memory block is a hot block.

The hot block decision unit 154 may include a register (not illustrated) configured to store the reference level CWL for the hot block check operation. The process by which the hot block decision unit 154 performs the hot block check operation will be described in detail with reference to FIG. 7.

The block replacement unit 155 may perform the hot block management operation on the target memory block, based on the physical block address PBA transferred from the hot block decision unit 154. The block replacement unit 155 may access the nonvolatile memory device 130 while performing the hot block management operation. The process by which the block replacement unit 155 performs the hot block management operation will be described in detail with reference to FIG. 8.

The reference level raising unit 156 may decide whether to raise the reference level CWL, in response to the result HOT transferred from the hot block decision unit 154. When the wear levels of all the memory blocks which need to be wear-leveled in the nonvolatile memory device 130 are higher than the reference level CWL, the reference level raising unit 156 may decide to raise the reference level CWL, and transfer the decision result NCWL to the hot block decision unit 154. For example, the reference level raising unit 156 may increase a predetermined count whenever the result HOT indicating that the target memory block is a hot block is received from the hot block decision unit 154, and determine whether the count has reached the number of memory blocks to be wear-leveled in the nonvolatile memory device 130. When the corresponding count has reached the number of memory blocks to be wear-leveled, it may indicate that the wear levels of the memory blocks are higher than the reference level CWL. Therefore, when the corresponding count reaches the number of memory blocks to be wear-leveled, the reference level raising unit 156 may transfer the decision result NCWL to the hot block decision unit 154.

FIG. 6 illustrates the logical block mapping table LBMT and the physical block mapping block PBMT according to an embodiment.

In an embodiment, the physical block mapping table PBMT may be stored in the nonvolatile memory device 130. The physical block mapping table PBMT may use the physical block address PBA of the nonvolatile memory device 130 as an index. The nonvolatile memory device 130 may include eight memory blocks, for example, and the memory blocks may correspond to physical block address PBA of 0 to 7, respectively.

The entries of the physical block mapping table PBMT may include fields for the logical block address LBA and the accumulative access count AAC. The field for the logical block address LBA may include a logical block address mapped to the physical block address PBA of the index. The field for the accumulative access count AAC may include the accumulative access count of the physical block address PBA of the index.

For example, an entry PBA3 corresponding to a physical block address PBA of 3 may include a logical block address LBA of 1 mapped to the physical block address PBA of 3 and an accumulative access count AAC of 9,800 in the memory block with the physical block address PBA of 3.

The logical block mapping table LBMT may be stored in the volatile memory device 120.

The logical block mapping table LBMT may use the logical block address LBA as an index. FIG. 6 is based on the supposition that the logical block address LBA has a value of 0 to 5. The entries of the logical block mapping table LBMT may include fields for the physical block address PBA and the access count AC. The field for the physical block address PBA may include a physical block address mapped to the logical block address LBA of the index. The field of the access count AC may include an access count of the logical block address LBA of the index.

For example, an entry LBA1 corresponding to the logical block address LBA of 1 may include the physical block address PBA of 3 mapped to the logical block address LBA of 1 and an access count AC of 98 in the memory block with the physical block address PBA of 3.

The logical block mapping table LBMT may be generated by conversion of the physical block mapping table PBMT during booting of the memory system 100, and stored in the volatile memory device 120, for example. That is, because the logical block mapping table LBMT includes the logical block addresses LBA and the physical block addresses PBA at the opposite positions of the physical block mapping table PBMT, the logical block mapping table LBMT may be created by converting the physical block mapping table PBMT. When the memory system 100 is booted, the access count AC may be set to 0. When the memory system 100 is to be powered off, the access count AC may be added to the accumulative access count AAC during the power-off of the memory system 100.

In another embodiment, the logical block mapping table LBMT may be stored in the nonvolatile memory device 130 during the power-off of the memory system 100. The logical block mapping table LBMT stored in the nonvolatile memory device 130 may be loaded to the volatile memory device 120 during booting of the memory system 100.

FIG. 7 illustrates a process of setting the target memory block to a hot block.

At time points T71, T72, and T73 of FIG. 7, the target memory block may correspond to the physical block address PBA of 3 and the logical block address LBA of 1. Therefore, the entry LBA1 of the logical block address LBA is 1, read from the logical block mapping table LBMT of FIG. 6, and the entry PBA3 of the physical block address PBA is 3, read from the physical block mapping table PBMT of FIG. 6.

In the illustrative example of FIG. 7, the wear level of the target memory block at time points T71 to T73 of FIG. 7 corresponds to the quotient of the accumulative access count AAC divided by 10,000, as shown in FIG. 3. For example, the wear level of the target memory block at time point T71 may correspond to 0 when the quotient of the accumulative access count AAC (e.g., 9,800) divided by 10,000 is less than 1.

Furthermore, in the example shown, the check count is 100 and the reference level is 0 at time points T71 to T73.

When the target memory block is write-accessed at time point T71, the count unit 151 increases the access count AC from 98 to 99. However, because the access count AC has not yet reach the check count of 100, the access count AC is not accumulated in the accumulative access count AAC, and the hot block check operation will not be performed.

When the target memory block is write-accessed at time T72, the count unit 151 increases the access count AC from 99 to 100. Because the access count AC has reached the check count of 100, the check timing determination unit 152 determines that the hot block check timing for the target memory block has arrived. Therefore, the accumulative count unit 153 increases the accumulative access count AAC from 9,800 to 9,900 (i.e., by the check count of 100), and the count unit 151 resets the access count AC to 0. The wear level of the target memory block remains at 0 since the accumulative access count AAC is 9,900. Because the wear level of the target memory block is equal to the reference level of 0, the hot block decision unit 154 decides that the target memory block is not a hot block.

Between time points T72 and T73, the target memory block may be intensively write-accessed. As a result, the access count AC may be increased from 99 to 100 at time point T73. Because the access count AC has reached the check count of 100, the check timing determination unit 152 determines that the hot block check timing for the target memory block has arrived. In response, the accumulative count unit 153 increases the accumulative access count AAC from 9,900 to 10,000, and the count unit 151 resets the access count AC to 0. The wear level WL of the target memory block corresponds to 1 since the accumulative access count AAC has increased to 10,000. Because the wear level WL of the target memory block is higher than the reference level of 0, the hot block decision unit 154 sets the target memory block to a hot block.

Figure 8:
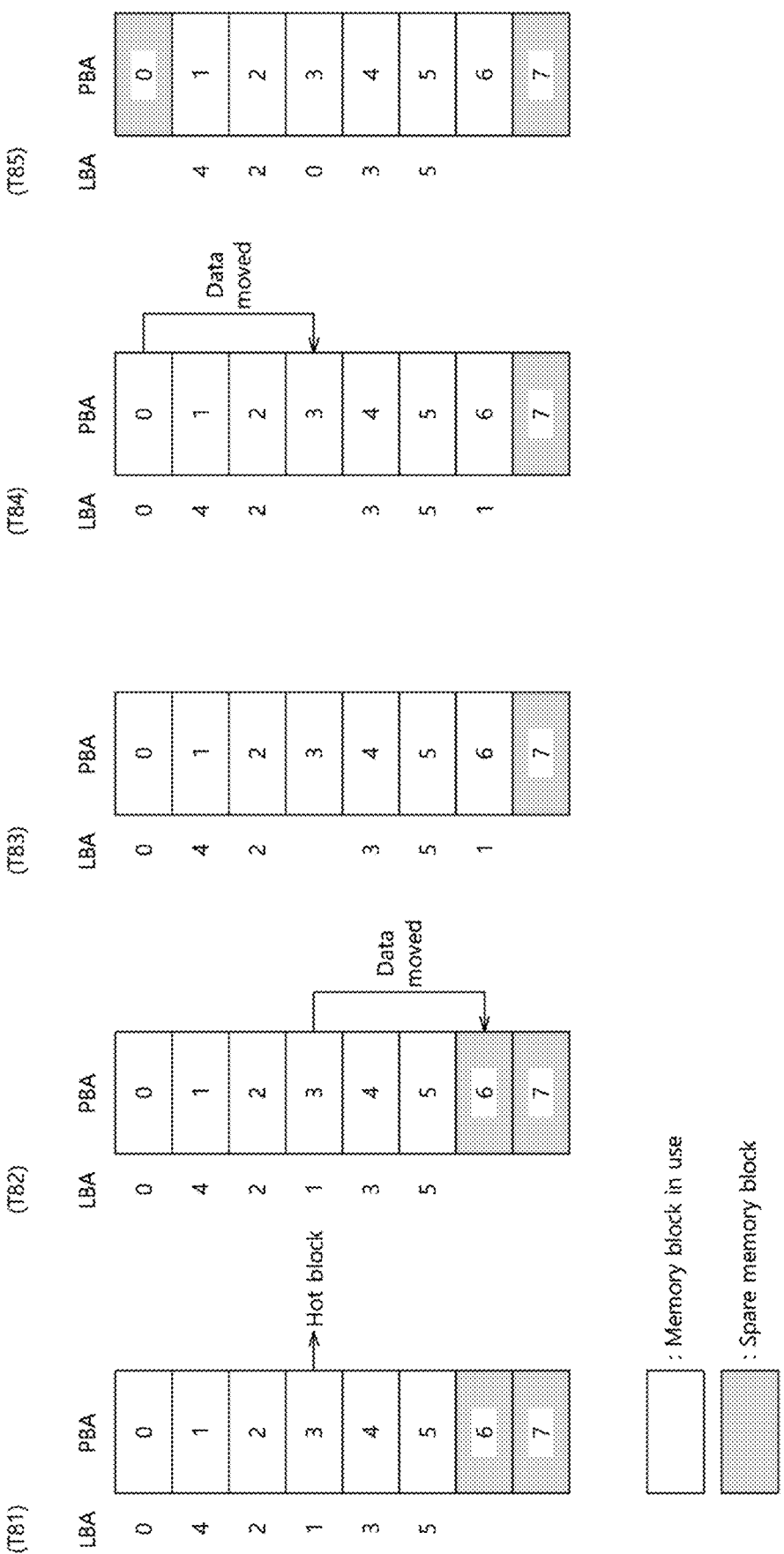
FIG. 8 illustrates a process in which a block replacement unit of FIG. 5 performs a hot block management operation according to an embodiment.

FIG. 8 illustrates a process by which the block replacement unit 155 of FIG. 5 performs a hot block management operation according to an embodiment. FIG. 8 illustrates a process of suppressing a write access to a memory block set to a hot block over time points T81, T82, T83, T84, and T85. FIG. 8 illustrates the logical block addresses LBA corresponding to the physical block addresses PBA at each of time points T81 to T85.

At time point T81, the memory blocks corresponding to the physical block addresses PBA of 0 to 5 may be in use, and the memory blocks corresponding to the physical block addresses PBA of 6 and 7 are spare memory blocks. The memory block with the physical block address of 3 is set to a hot block.

At time point T82, data stored in the hot block, i.e., data of the logical block address of 1 may be copied or moved to the spare memory block corresponding to the physical block address of 6.

At time point T83, the physical block address of 6 is mapped to the logical block address of 1, and the mapping of the physical block address of 3 is removed. Therefore, the hot block with the physical block address of 3 may not be write-accessed any more, and additional wear of the hot block is prevented.

The data of the logical block address of 1 may include hot data which are frequently updated. Like the spare memory block of the physical block address of 6, the spare memory blocks may be used to store the hot data, instead of the hot block. Therefore, when the nonvolatile memory device 130 is short of the spare memory blocks, a spare memory block needs to be added. In the present embodiment, when the nonvolatile memory device 130 is short of spare memory blocks, a spare memory block may be added as follows.

At time point T84, data stored in the memory block with the physical block address of 0, i.e., data of the logical block address of 0 may be copied or moved to the memory block with the physical block address of 3. At this time, the memory block with the physical block address of 0 may be a cold block. In the present embodiment, the cold block may indicate a memory block having the same wear level as the current reference level. Data stored in the cold block may include cold data which are not frequently updated.

In short, the hot block with the physical block address of 3 may be controlled, using the logical block to physical block mapping, to store cold data.

At time point T85, the physical block address of 3 is mapped to the logical block address of 0, and the mapping of the physical block address of 0 is removed. The memory block with the physical block address of 0 is set to a spare memory block.

In short, although the hot block with the physical block address of 3 is not in use, the hot block may not be allocated as a spare memory block. Instead, the cold block with the physical block address of 0 is allocated as a spare memory block after any data stored in the cold block is transferred to the hot block and the logical to physical mapping adjusted accordingly.

Figure 9:
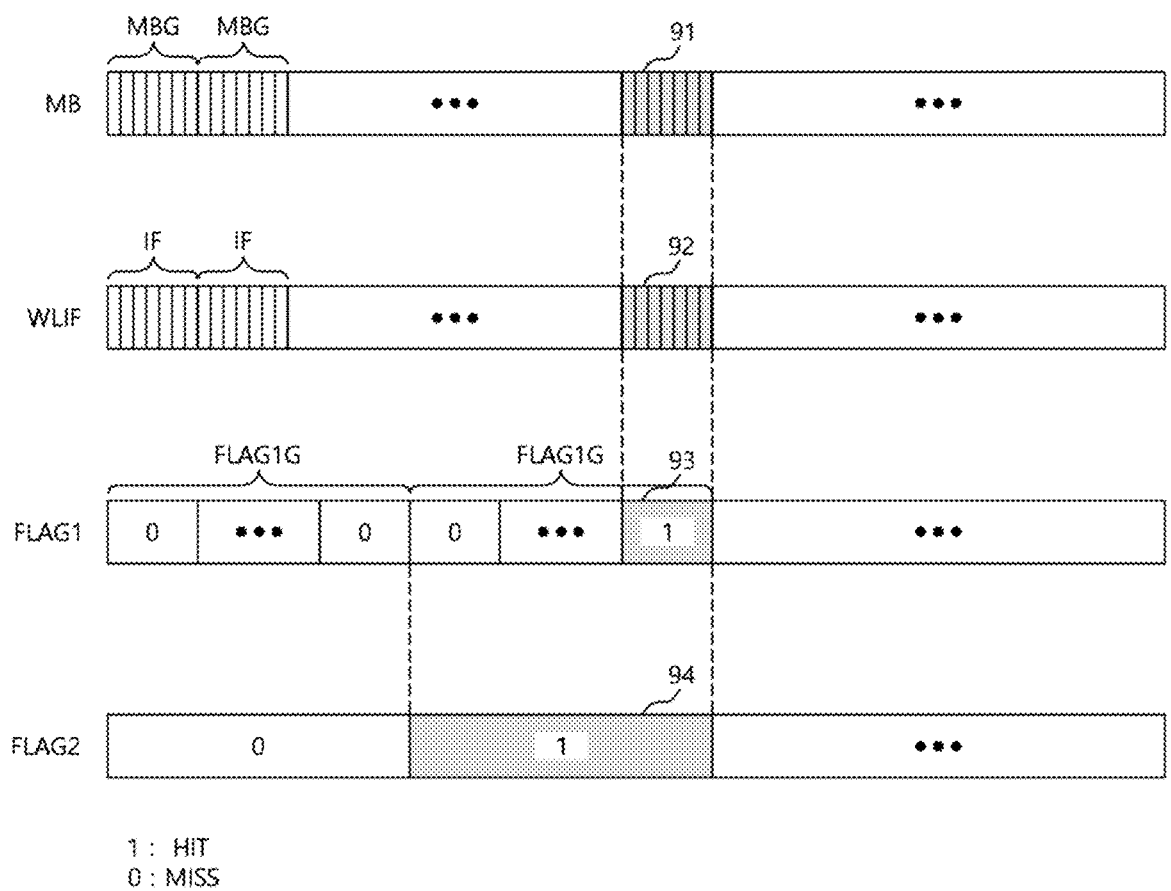
FIG. 9 illustrates a process in which the wear leveling unit of FIG. 1 searches for a cold block according to an embodiment.

FIG. 9 illustrates a process by which the wear leveling unit 111 of FIG. 1 searches for a cold block according to an embodiment.

The wear leveling unit 111 may store wear level information WLIF in the volatile memory device 120, and manage the wear level information WLIF. The wear level information WLIF may include the wear levels of the memory blocks MB included in the nonvolatile memory device 130. The wear levels of the respective memory blocks may be determined according to the accumulative access counts AAC of the memory blocks as described above.

In another embodiment, the wear level information WLIF may be managed with the logical block mapping table LBMT of FIG. 6. For example, the logical block mapping table LBMT may include wear levels corresponding to the respective logical block addresses.

When a memory block has the same wear level as the current reference level, the memory block may correspond to a cold block. Therefore, in order to search for a cold block, the wear leveling unit 111 may check the wear levels in the wear level information WLIF, and compare the wear levels to the current reference level. The wear leveling unit 111 may efficiently search for a cold block by performing a hierarchical search operation on the wear level information WLIF.

In an embodiment, the wear leveling unit 111 may divide the wear level information WLIF into information pieces IF. Each of the information pieces IF may include the wear levels of a predetermined number of memory blocks MB. The predetermined number of memory blocks corresponding to each of the information pieces IF may be hereinafter referred to as a memory block group. Therefore, the memory blocks MB may be divided into a plurality of memory block groups MBG corresponding to the respective information pieces IF.

The wear leveling unit 111 may generate a first flag FLAG1 of the corresponding memory block group MBG based on the information pieces IF. For example, the wear leveling unit 111 may compare wear levels included in each of the information pieces IF to the current reference level, and determine whether the corresponding memory block group includes the predetermined number of cold blocks or more. The wear leveling unit 111 may generate the first flag FLAG1 of the corresponding memory block group MBG, according to the determination result.

Therefore, the first flag FLAG1 may indicate whether the corresponding memory block group MBG includes the predetermined number of cold blocks or more. The first flag FLAG1 being "hit" may indicate that the corresponding memory block group MBG includes the predetermined number of cold blocks or more, and the first flag FLAG1 being "miss" may indicate that the corresponding memory block group MBG does not include the predetermined number of cold blocks or more.

When performing a hierarchical search operation at level 1, the wear leveling unit 111 may select an information piece IF in which is the wear levels are to be checked, based on the first flag FLAG1. That is, the wear leveling unit 111 may check the wear levels in the information piece IF indicated by the first flag FLAG1 being hit.

In order to improve the efficiency of the search operation, the first flags FLAG1 may be structured as a hierarchical search structure at level 2. For example, the wear leveling unit 111 may divided the first flags FLAG1 into first flag groups FLAG1G, and generate second flags FLAG2 of the respective first flag groups FLAG1G. The wear leveling unit 111 may determine whether each of the first flag groups FLAG1G includes a predetermined number of first flags corresponding to hit, and generate the second flag FLAG2 of the first flag group FLAG1G according to the determination result.

Therefore, the second flag FLAG2 may indicate whether the corresponding first flag group FLAG1G includes the predetermined number of first flags FLAG1 or more, which correspond to hit. The second flag FLAG2 being hit may indicate that the first flag group FLAG1G includes the predetermined number of first flags or more, which correspond to hit, and the second flag FLAG2 of miss may indicate that the first flag group FLAG1G does not include the predetermined number of first flags or more, which correspond to hit.

Referring to FIG. 9, the case in which the hierarchical search operation at level 2 is performed will be described as follows. First, the wear leveling unit 111 may select a second flag 94 that is hit among the second flags FLAG2. The wear leveling unit 111 may select a first flag 93 that is hit in the first flag group FLAG1G indicated by the selected second flag 94. The wear leveling unit 111 may check wear levels of an information piece 92 indicated by the selected first flag 93. The wear leveling unit 111 may check the wear levels of the information piece 92, and search for a cold block in the memory block group 91 corresponding to the information piece. FIG. 9 demonstrates that the hierarchical search process is more efficient than when the wear level information WLIF is checked from the beginning or an arbitrary point, in order to search for a cold block.

In accordance with the present embodiment, the first flags FLAG1 may be expanded to the hierarchical search structure at the plurality of levels. That is, the upper-level flags may be generated based on the lower-level flags, in a similar manner to the process for generating the second flags FLAG2 based on the first flags FLAG1.

When the hierarchical search operation is performed in the hierarchical search structure with the plurality of levels, the wear leveling unit 111 may select a hit flag among the top-level flags. The top-level flags may indicate flags at the level which is finally generated. The wear leveling unit 111 may select a hit flag in a lower-level flag group indicated by the selected top-level flag, and repeat selecting a flag while moving between levels. The wear leveling unit 111 may finally select a certain first flag FLAG1, and check the wear levels of the information piece IF indicated by the first flag FLAG1.

In another embodiment, the wear leveling unit 111 may manage a search point for each information piece IF of the wear level information WLIF. The search point may indicate the last position where a cold block was found in the corresponding information piece IF. Therefore, when searching for a cold block in the corresponding information piece IF again, the wear leveling unit 111 may start searching from the current search point.

In another embodiment, the wear leveling unit 111 may manage the number of cold blocks in each of the information pieces IF of the wear level information WLIF.

Figure 10:
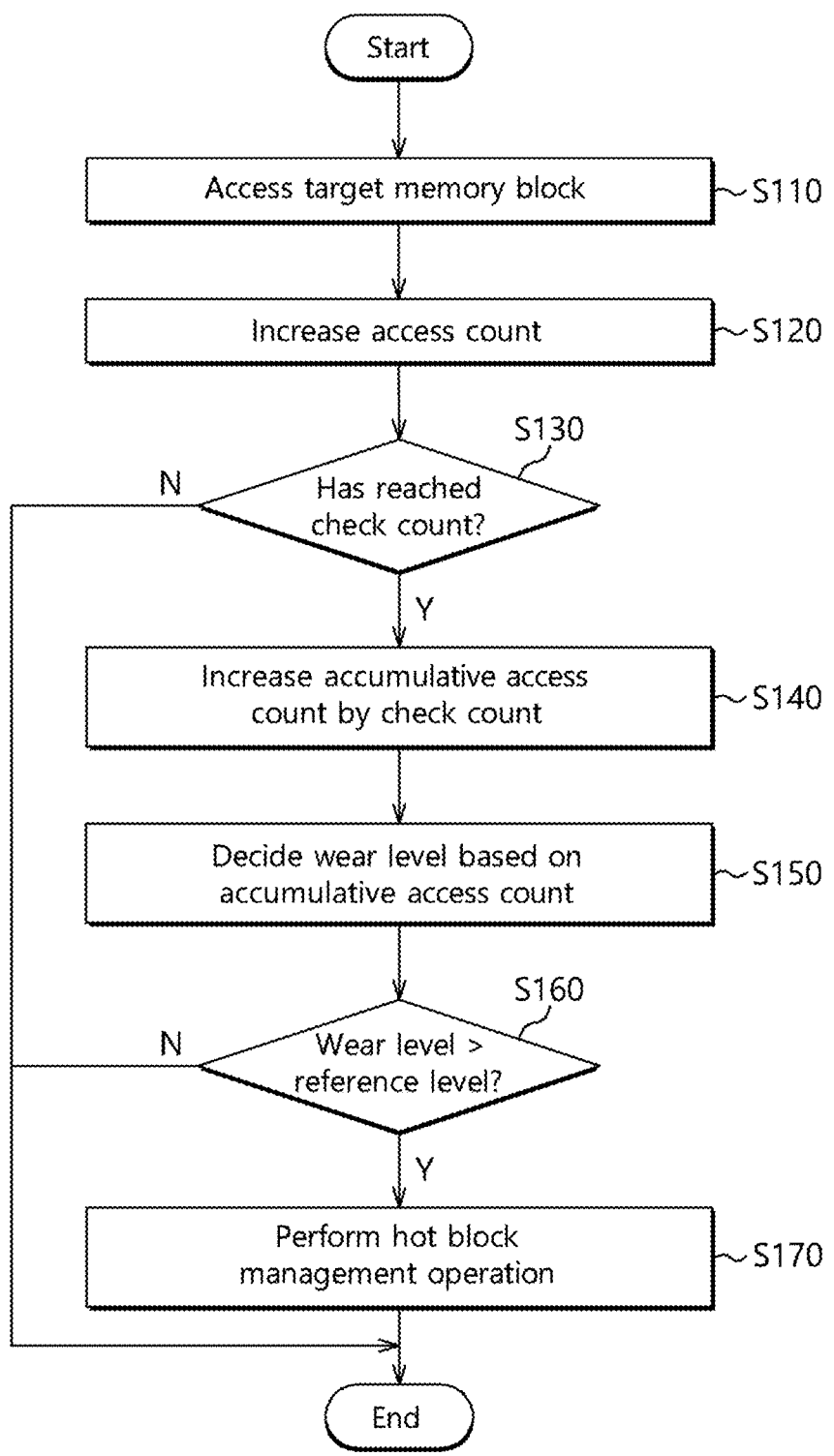
FIG. 10 is a flowchart illustrating an operating process of the wear leveling unit of FIG. 1 according to an embodiment.

FIG. 10 is a flowchart illustrating an operating process of the wear leveling unit 111 of FIG. 1 according to an embodiment.

At step S110, the wear leveling unit 111 may access a target memory block according to a request of the host device.

At step S120, the wear leveling unit 111 may increase the access count of the target memory block.

At step S130, the wear leveling unit 111 may determine whether the access count of the target memory block has reached the check count. When the access count of the target memory block did not reach the check count, the process may be ended. When the access count of the target memory block has reached the check count, the process may proceed to step S140.

At step S140, the wear leveling unit 111 may increase the accumulative access count of the target memory block by the check count.

At step S150, the wear leveling unit 111 may decide the wear level of the target memory block based on the accumulative access count of the target memory block.

At step S160, the wear leveling unit 111 may determine whether the wear level of the target memory block exceeds the reference level. When the wear level of the target memory block does not exceed the reference level, the process may be ended. When the wear level of the target memory block exceeds the reference level, the process may proceed to step S170.

At step S170, the wear leveling unit 111 may set the target memory block to a hot block, and perform the hot block management operation on the target memory block.

Figure 11:
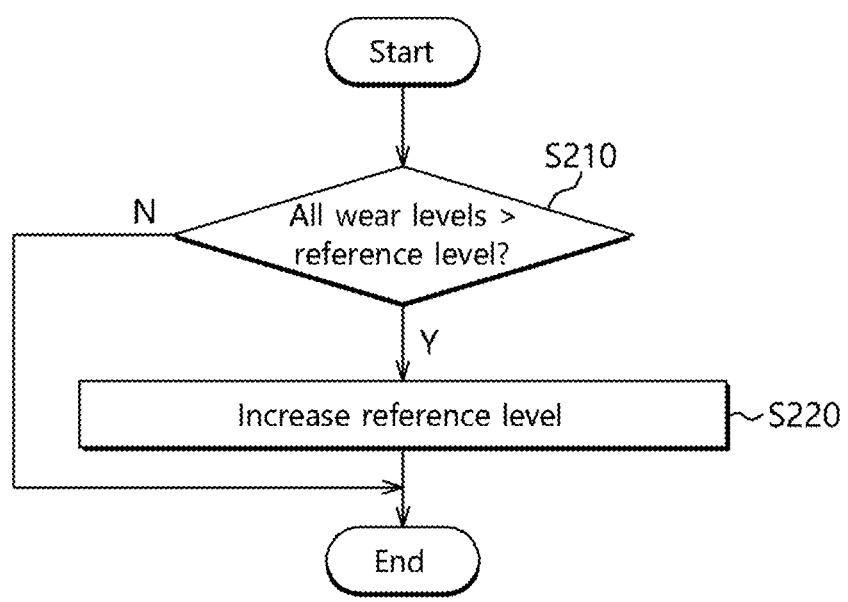
FIG. 11 is a flowchart illustrating an operating process of the wear leveling unit of FIG. 1 according to an embodiment.

FIG. 11 is a flowchart illustrating an operating process of the wear leveling unit 111 of FIG. 1 in accordance with the embodiment.

At step 210, the wear leveling unit 111 may determine whether all the wear levels of the memory blocks of the nonvolatile memory device 130 exceed the reference level, at step S210. When all of the wear levels do not exceed the reference level, the procedure may be ended. When all of the wear levels exceed the reference level, the process may proceed to step S220.

At step S220, the wear leveling unit 111 may increase the reference level.

In accordance with the present embodiments, the memory system and the operating process can efficiently perform a wear leveling operation on the nonvolatile memory device, thereby extending the lifespan of the nonvolatile memory device.

While various embodiments have been described above, it will be understood to those skilled in the art that the embodiments described are examples only. Accordingly, the memory system and the operating process described herein should not be limited based on the described embodiments.

What is claimed is:

1. A memory system, comprising:
   a nonvolatile memory device including a plurality of memory blocks; and
   a wear leveling unit configured to increase an accumulative access count of a first memory block among the memory blocks by a predetermined value, determine a wear level corresponding to an accumulative access count section including the accumulative access count of the first memory block among wear levels corresponding to accumulative access count sections, set the first memory block to a hot block based on the wear level, and perform a hot block management operation on the hot block.

2. The memory system according to claim 1, wherein the wear leveling unit increases an access count when the first memory block is accessed, and increases the accumulative access count by the predetermined value in response to the access count reaching the predetermined value.

3. The memory system according to claim 2, wherein the wear leveling unit resets the access count in response to the accumulative access count being increased.

4. The memory system according to claim 2, further comprising a volatile memory device,
wherein the accumulative access count is stored in the nonvolatile memory device, and
wherein the access count is stored in the volatile memory device.

5. The memory system according to claim 4, wherein the accumulative access count is included in a first table, the first table using a physical block address corresponding to the first memory block as an index, and
wherein the access count is included in a second table, the second table using a logical block address as an index, the logical block address corresponding to data stored in the first memory block.

6. The memory system according to claim 1, wherein the wear leveling unit sets the first memory block to the hot block in response to the wear level exceeding a reference level.

7. The memory system according to claim 6, wherein the wear leveling unit increases the reference level when wear levels of all the memory blocks exceed the reference level.

8. The memory system according to claim 1, wherein the wear leveling unit performs the hot block management operation by moving or copying data stored in the first memory block to a second memory block and limiting a write access to the first memory block.

9. The memory system according to claim 8, wherein when setting a third memory block to a cold block based on a wear level of the third memory block, the wear leveling unit performs the hot block management operation by moving or copying data stored in the third memory block to the first memory block.

10. The memory system according to claim 9, wherein when the wear level of the third memory block is lower than a wear level of the first memory block, the wear leveling unit sets the third memory block to the cold block.

11. The memory system according to claim 1, wherein the wear leveling unit manages wear level information including wear levels of the memory blocks, divides the wear level information into information pieces, each information piece including wear levels of corresponding memory blocks, generates first flags corresponding to the respective information pieces, structures the first flags into a hierarchical search structure with a plurality of levels, and searches for a cold block through a hierarchical search operation on the hierarchical search structure.

12. The memory system according to claim 11, wherein each of the first flags indicates whether the corresponding memory blocks includes a predetermined number of cold blocks or more.

13. The memory system according to claim 11, wherein an upper-level flag in the hierarchical search structure indicates whether lower-level flags corresponding to the upper-level flag include a predetermined number of hit flags or more, wherein a hit flag is a flag indicating that corresponding memory blocks include a predetermined number of cold blocks or more or that a corresponding lower-level flag group includes a predetermined number of hit flags or more.

14. The memory system according to claim 11, wherein the wear leveling unit searches for the cold black by selecting a first flag among the first flags through the hierarchical search operation, and comparing wear levels of an information piece corresponding to the first flag to a reference level.

15. A memory system comprising:
a nonvolatile memory device comprising memory blocks; and
a wear leveling unit configured to update an accumulative access count of a first memory block when an access count of the first memory block reaches a check count, and perform a hot block management operation on the first memory block when a wear level calculated from the accumulative access count exceeds a reference level.

16. The memory system according to claim 15, wherein the wear leveling unit increases the access count whenever the first memory block is accessed, and increases the accumulative access count by the check count when the access count reaches the check count.

17. The memory system according to claim 16, wherein the wear leveling unit resets the access count when the accumulative access count is increased.

18. The memory system according to claim 15, further comprising a volatile memory device,
wherein the accumulative access count is stored in the nonvolatile memory device, and
wherein the access count is stored in the volatile memory device.

19. The memory system according to claim 15, wherein the accumulative access count is included in a first table, the first table using a physical block address corresponding to the first memory block as an index, and
wherein the access count is included in a second table, the second table using a logical block address as an index, the logical block address corresponding to data stored in the first memory block.

20. The memory system according to claim 15, wherein the wear leveling unit increases the reference level when wear levels of all the memory blocks exceed the reference level.

21. The memory system according to claim 15, wherein the wear leveling unit performs the hot block management operation by moving or copying data stored in the first memory block to a second memory block and limiting a write access to the first memory block.

22. The memory system according to claim 21, wherein when setting a third memory block to a cold block based on a wear level of the third memory block, the wear leveling unit performs the hot block management operation by moving or copying data stored in the third memory block to the first memory block.

23. The memory system according to claim 22, wherein when the wear level of the third memory block is lower than a wear level of the first memory block, the wear leveling unit sets the third memory block to the cold block.

24. The memory system according to claim 15, wherein the wear leveling unit manages wear level information including wear levels of the memory blocks, divides the wear level information into information pieces, each information piece including wear levels of corresponding memory blocks, generates first flags corresponding to the respective information pieces, structures the first flags into a hierarchical search structure with a plurality of levels, and searches for a cold block through a hierarchical search operation on the hierarchical search structure.

25. The memory system according to claim 24, wherein each of the first flags indicates whether the corresponding memory blocks include a predetermined number of cold blocks or more.

26. The memory system according to claim 24, wherein an upper-level flag in the hierarchical search structure indicates whether lower-level flags corresponding to the upper-level flag include a predetermined number of hit flags or more, wherein a hit flag is a flag indicating that corresponding memory blocks include a predetermined number of cold blocks or more or that a corresponding lower-level flag group includes a predetermined number of hit flags or more.

27. The memory system according to claim 24, wherein the wear leveling unit searches for the cold block by selecting a first flag among the first flags through the hierarchical search operation, and comparing wear levels of an information piece corresponding to the first flag to the reference level.

28. A memory system comprising:
a nonvolatile memory device comprising memory blocks; and
a wear leveling unit configured to manage wear levels of the memory blocks, and perform a hot block management operation on a first memory block when a wear level of the first memory block exceeds a reference level,
wherein the wear leveling unit increases the reference level when all of the wear levels exceed the reference level.

29. The memory system according to claim 28, wherein the wear leveling unit increases an access count of the first memory block whenever the first memory block is accessed, increases an accumulative access count of the first memory block by a predetermined value when the access count reaches the predetermined value, and decides the wear level based on the accumulative access count.

30. The memory system according to claim 29, wherein the wear leveling unit resets the access count when the accumulative access count is increased.

31. The memory system according to claim 29, further comprising a volatile memory device,
wherein the accumulative access count is stored in the nonvolatile memory device, and
wherein the access count is stored in the volatile memory device.

32. The memory system according to claim 31, wherein the accumulative access count is included in a first table which uses a physical block address corresponding to the first memory block as an index, and
the access count is included in a second table which uses a logical block address as an index, the logical block address corresponding to data stored in the first memory block.

33. The memory system according to claim 28, wherein the wear leveling unit performs the hot block management operation by moving or copying data stored in the first memory block to a second memory block and limiting a write access to the first memory block.

34. The memory system according to claim 33, wherein when setting a third memory block to a cold block based on a wear level of the third memory block, the wear leveling unit performs the hot block management operation by moving or copying data stored in the third memory block to the first memory block.

35. The memory system according to claim 34, wherein when the wear level of the third memory block is lower than a wear level of the first memory block, the wear leveling unit sets the third memory block to the cold block.

36. The memory system according to claim 28, wherein the wear leveling unit divides wear level information including the wear levels of the memory blocks into information pieces, each information piece including wear levels of corresponding memory blocks, generates first flags corresponding to the respective information pieces, structures the first flags into a hierarchical search structure with a plurality of levels, and searches for a cold block through a hierarchical search operation on the hierarchical search structure.

37. The memory system according to claim 36, wherein each of the first flags indicates whether the corresponding memory blocks include a predetermined number of cold blocks or more.

38. The memory system according to claim 36, wherein an upper-level flag in the hierarchical search structure indicates whether lower-level flags corresponding to the upper-level flag include a predetermined number of hit flags or more, wherein a hit flag is a flag indicating that corresponding memory blocks include a predetermined number of cold blocks or more or that a corresponding lower-level flag group includes a predetermined number of hit flags or more.

39. The memory system according to claim 36, wherein the wear leveling unit searches for the cold block by selecting a first flag among the first flags through the hierarchical search operation, and comparing wear levels of an information piece corresponding to the first flag to the reference level.

* * * * *